3,031,462
COMPLEX COBALT-ORGANO COMPOUNDS CONTAINING CARBON MONOXIDE AND THEIR PRODUCTION

Walter Hieber, Munich, Germany, assignor to Badische Anilin- & Soda-Fabrik Aktiengesellschaft, Ludwigshafen (Rhine), Germany
No Drawing. Filed May 26, 1959, Ser. No. 815,796
Claims priority, application Germany May 29, 1958
11 Claims. (Cl. 260—340.6)

This invention relates to the production of complex cobalt-organo compounds and more particularly to the production of a compound which contains cobalt in complex combination with an organic ligand as a cation and which also contains cobalt in combination with carbonyl as the anion.

It has been proposed to employ cobalt compounds containing carbon monoxide in various carbonylation reactions, e.g. in the carbonylation of unsaturated aliphatic hydrocarbons, and in addition to the use of cobalt carbonyl, it has also been suggested that catalysts be employed which contain cobalt in complex form with an organic ligand. For example, dicobalt tetracarbonyl has been reacted with methylnitrile so as to recover a divalent cobalt nitrile dicobalt carbonylate according to the formula $$[Co(CH_3CN)_6][Co(CO)_4]_2$$

At a temperature of 20° C. and under a high vacuum, it has been possible to reduce the nitrile content of this compound to obtain complexes which are richer in carbon monoxide corresponding to the formula $$[Co(CH_3CN)_{1.56}][Co(CO)_4]_2$$

In many attempts to prepare complex cobalt compound with various organic ligands, it has been impossible to isolate or to identify any specific compound. Thus, very little has been known prior to this time with respect to the ratio of divalent cobalt to the organic ligand since, in most instances, the formation of the complex compound is only theoretical. A particularly desirable feature for complex cobalt catalysts is that they contain a relatively large quantity of carbon monoxide in the molecule. With the production of the cobalt complex of methylnitrile, an enrichment of the complex in its carbon monoxide content is quite difficult, because the complex compound is quite unstable.

An object of the present invention is to provide novel cobalt-organo complex compounds which are rich in carbon monoxide and which are relatively stable and pure crystalline compounds.

Another object of the invention is to provide a process for the production of the new cobalt complexes.

Yet another object of the invention is to provide cobalt-organo complex compounds containing carbon monoxide which are insoluble in water but which are soluble in various organic solvents.

Still another object of the invention is to provide complex compounds of cobalt capable of being employed in carbonylation reaction systems and capable of being recovered from these reaction systems.

These and other objects and advantages of the invention will become more apparent upon a consideration of the following detailed description.

In accordance with the invention, it has now been found that substantially pure and crystalline complex cobalt-organo compounds can be obtained by reacting dicobalt octacarbonyl with an organic compound capable of complexing with cobalt in an inert solvent at temperatures below about 100° C., advantageously about 50° C. and preferably between about —10° C. and 25° C.

Novel compounds are obtained when dicobalt octacarbonly is reacted with cycloalkanones, aromatic ketones or cyclic diethers, these three groups of organic compounds being in complex combination with divalent cobalt as the cationic portion of the complex compound which also contains a cobalt tetracarbonyl anion. In the complex compound, there should not be more than six molecules of the organic ligand for each gram atom of cationic cobalt, and preferably not more than 3 molecules of the organic ligand for each gram atom of cationic cobalt. Furthermore, the complex compounds contain 2 molecules of the cobalt tetracarbonyl anion having the formula $$[Co(CO)_4]^-$$

for each gram atom of cationic cobalt. When preparing and recovering these crystalline complex compounds, care must be taken to avoid high temperatures, because even these relatively stable complex compounds tend to deteriorate or decompose. It is preferred that the compounds be maintained at room temperature, i.e. 20° C., or lower, and in any case temperatures above 40° C. for a long period of time must be avoided to prevent a complete loss of the complex compound.

Particularly suitable organic compounds which will complex with cobalt in accordance with the present invention are the aromatic ketones, such as acetophenone, benzophenone, propiophenone, pyrophenone, or diketones, such as benzil. Suitable cycloalkanones are preferably those with from 5 to 15 carbon atoms, such as pentanone, hexanone, heptanone, octanone, decanone, dodecanone and pentadecanone. As cyclic diethers, dioxan and its homologues and particularly suitable, for example dioxan itself and 4,4'-dimethyl-1,3-dioxan.

Although the chemical structure of these complex compounds cannot be exactly stated, it has been found upon analysis that these cobalt complexes containing carbon monoxide can be given the general formula (I) $$[CoX_n^{++}][Co(CO)_4^-]_2$$

wherein X represents the organic ligand selected from the group consisting of cycloalkanones, aromatic ketones and cyclic diethers and $n$ is a whole number or a fraction not more than 6 and preferably less than 3. The following examples will further illustrate specific compounds which have been formed in accordance with the invention and which can be given the above theoretical formula.

Where $n$ is a whole number in the above Formula I, it will thus be an integer of from 1 to 6, inclusive. On the other hand, if $n$ is to represent a fraction, the cobalt-organo complex compound can be designated by the formula (II) $$\left[CoX_{\frac{1}{m}}^{++}\right][Co(CO)_4^-]_2$$

wherein $m$ is an integer of 2 and 4.

With acetophenone there is formed especially a compound with only one half mol of ketone per cobalt (II) atom according to the equation:

$$2(Co(CO)_4)_2 + C_6H_5 \cdot CO \cdot CH_3 = 2(Co(C_6H_5 \cdot CO \cdot CH_3)_{1/2})(Co(CO)_4)_2 + 8CO$$

whereas in the reaction with benzophenone, a reaction product is obtained with only ¼ mol of ketone per cobalt (II) atom according to the following formula:

$$(Co(C_6H_5 \cdot CO \cdot C_6H_5)_{1/4})(Co(CO)_4)_2$$

Similarly, by treatment with benzil, the following compound is obtained:

$$(Co(C_6H_5 \cdot CO \cdot CO \cdot C_6H_5)_{1/4})(Co(CO)_4)_2$$

Cyclic ketones are also suitable for the reactions according to this invention.

With dioxan a compound is obtained which corresponds to the following formula:

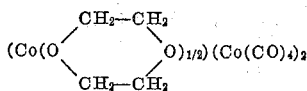

The same course of the reaction is observed with aliphatic ethers, as the disengagement of carbon monoxide and the formation of anionic and cationic cobalt indicate, but no definite compound is detected.

Suitable inert solvents are aliphatic, cycloaliphatic and aromatic hydrocarbons, such as petroleum ether, cyclohexane, benzene and homologues, such as toluene, xylenes and mesitylene. Other solvents, such as dimethyl ether, diethyl ether or acetone, which give with dicobalt octacarbonyl the said course of the reaction without it being possible to isolate a definite compound in pure form, are also suitable.

The compounds obtained, not hitherto known, may be used for example as catalysts, such as in the carbonylation of unsaturated hydrocarbons or compounds containing hydroxyl groups. The complex compounds are preferably used in the form of their components from which they can be formed intermediately in the reaction medium.

The following examples will further illustrate this invention but the invention is not restricted to these Examples.

*Example 1*

169 milligrams (0.495 millimol) of dicobalt octacarbonyl are dissolved in 2 millimeters of petroleum ether and caused to react with 2 millimeters of acetophenone. The reaction begins at about 5° C. and after 2 days, 24.3 ccs. of carbon monoxide, corresponding to 1.10 CO/Co, can be pumped away.

The crystals which separate are washed several times with cooled petroleum ether and dried in a high vacuum at room temperature. Unreacted dicobalt octacarbonyl can be detected in the filtrate.

From further experiments it has been found that even a greater excess of acetophenone does not effect a quantitative course of the reaction. Even by heating to 30° to 40° C., complete conversion does not take place because at this temperature decomposition products, such as cobalt tricarbonyl, already occur. The separated black-brown crystals dissolve well in acetone and methanol but are insoluble in water. Decomposition occurs immediately in air; under nitrogen, acetophenone is split off again in the course of a few days.

The substance is decomposed in concentrated ammonia and Per-hydrol (hydrogen peroxide) for purposes of analysis.

$[Co(C_6H_5.CO.CH_3)_{1/2}][Co(CO)_4]_2(460.9)$

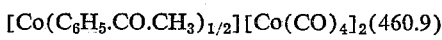

|  | Co | CO |
|---|---|---|
| Calculated | 38.35 | 48.60 |
| Found | 18.30 | 48.44 |

*Example 2*

1 gram of benzophenone is dissolved in 3 ml. of benzene and 236.3 mg. (0.694 millimol) of dicobalt octacarbonyl added. The reaction, which begins at 5° C., develops 34.8 ccs. of CO in 2 days, corresponding to 1.11 CO/Co. At the same time brown-black crystals separate and after washing several times with ether they are dried in a high vacuum. The compound behaves like that above. Dilute acid attacks the substance only relatively slowly by reason of the hydrophobic behavior thereof; an odor of cobalt carbonyl hydride thereby occurs. With sodium sulfide, 34.8% of total cobalt are precipitated.

$[Co(CO_6H_5.CO.C_6H_5)_{1/4}][Co(CO)_4]_2(446.4)$

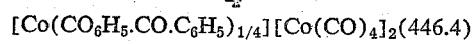

|  | Co | CO |
|---|---|---|
| Calculated | 39.42 | 50.08 |
| Found | 39.07 | 49.48 |

*Example 3*

267.4 mg. (0.781 millimol) of dicobalt octacarbonyl are added to a solution of 0.5 gram of benzil in 5 ml. of benzene and heated to 20° to 30° C.; vigorous evolution of gas takes place above 0° C. The amount of gas disengaged after 1 day amounts to 44.9 ccs. of CO, corresponding to 1.28 CO/Co. From the red-brown solution there separate in the course of several days, dark crystals which are thoroughly washed with cooled ether to remove excess benzil and finally dried in a high vacuum.

Under the microscope, the crystals are found to be rectangular and blue-black. For the rest, the compound behaves like those above.

350 mg. of the compound are dissolved in 150 ml. of acetone-petroleum ether (1:5) and ammonia is led in. The dark solution is thereby decolorized in a few minutes with the separation of 380 mg. of orange-colored hexammine colbalt (II) bis-(tetra-carbonyl cobaltate); the reaction proceeds almost quantitatively with the replacement of the benzil by 6 mols of ammonia.

$[Co(C_6H_5.CO.CO.C_6H_5)_{1/4}][Co(CO)_4]_2(453.4)$

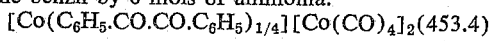

|  | Co | CO | C | H |
|---|---|---|---|---|
| Calculated | 39.04 | 49.45 | 30.88 | 0.60 |
| Found | 39.03 | 48.70 | 31.57 | 0.69 |

*Example 4*

When 3 ml. of dioxan are added to 218.8 mg. (0.641 millimol) of dicobalt octacarbonyl, a vigorous evolution of gas is observed even at −5° C. The dark brown solution becomes somewhat lighter during the reaction and at the same time dark crystals separate. If the reaction is allowed to proceed too rapidly—above 25° C.—there usually separates a brown oil which can only be caused to crystallize with great difficulty. The substance which has separated in the form of fine black crystals is filtered off, washed thoroughly with cooled ether and dried in a high vacuum at room temperature. Like the benzil compound, it is sensitive to air, soluble in acetone and methanol (slow solvolysis) and insoluble in water. Found: 30.6% of the total cobalt as CoS.

When 280 mg. of the compound are dissolved in petroleum ether and acetone (1:1) and ammonia is led in, 310 mg. of an orange-colored hexammine cobalt (II) bis-(tetracarbonyl cobaltate) separate out; the reaction proceeds quantitatively with the replacement of the dioxan by six mols of the ammonia.

$[Co(C_4H_8O_2)_{1/2}][Co(CO)_4]_2(444.9)$

|  | Co | CO | C | H |
|---|---|---|---|---|
| Calculated | 39.71 | 50.33 | 26.96 | 0.90 |
| Found | 39.62 | 49.71 | 26.49 | 0.47 |

*Example 5*

$[Co(cyclohexanone)_{1/2}][Co(CO)_4]_2$

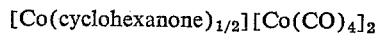

805.0 milligrams of cobalt carbonyl (2.36 millimols) are dissolved in 100 ccs. of absolute petroleum ether and 1 cc. of cyclohexanone (9.70 millimols) is added. The reaction is initiated by careful heating to at the most 30° C. and 1.10 CO/Co are formed within 4 days (calculated: 1.33 CO/Co). The deep black crystals which are precipitated and which are sensitive to air are dried in vacuo. The compound is insoluble in water and soluble with brown color in organic solvents such as methanol, acetone, or ethyl acetate. The yield is 60–70% with reference to the amount of cyclohexanone used.

Example 6

$$[Co(cyclooctanone)_{1/2}][Co(CO)_4]_2$$

An ethereal solution of 1 g. of cyclooctanone (8.9 millimols) is dripped into a solution of 750.0 milligrams of cobalt carbonyl (2.18 millimols) in 100 ccs. of absolute ether. The reaction is ended after 3 days and 1.05 CO/Co calculated: 1.33 CO/Co) are disengaged. The black crystals which are washed with a little absolute ether and petroleum ether are dried in vacuo. They are insoluble in water and soluble with dark-brown color in organic solvents. The yield is 40–50% with reference to the amount of cyclooctanone used.

Example 7

$$[CO(4,4'-dimethyl-1,3-dioxan)_{1/2}][Co(CO)_4]_2$$

An ethereal solution of 1 g. of 4.4'-dimethyl-1-3-dioxan (8.50 millimols) is added to a solution of 870.0 milligrams of cobalt carbonyl (2.48 millimols) in 100 ccs. of absolute ether. The reaction begins even at 0°, and is ended after 2 hours. 1.20 CO/Co (calculated 1.33 CO/Co) are disengaged. The black finely crystalline precipitate is filtered off by suction, washed with a little ether and dried in vacuo. The crystals which are sensitive to air dissolve with brown color in organic solvents such as methanol, acetone, benzene and slightly in ether. The yield is 60–70% with reference to the amount of dioxan used.

I claim:
1. A crystalline complex cobalt-organo compound selected from the group consisting of

(I)  $[CoX_n^{++}][Co(CO)_4^-]_2$ and (II) $\left[CoX_{\frac{1}{m}}^{++}\right][Co(CO)_4^-]_2$ wherein X represents an organic ligand selected from the group consisting of cycloalkanone of from 5 to 15 carbon atoms, acetophenone, benzophenone, propiophenone, pyrophenone, benzil, dioxane and 4,4'-dimethyl-1,3-dioxane, $n$ is an integer of from 1 to 6, inclusive, and $m$ is selected from the group of integers 2 and 4.

2. A crystalline complex cobalt-organo compound of the formula $$[Co(C_6H_5.CO.CH_3)_{1/2}][Co(CO)_4]_2$$

wherein $C_6H_5.CO.CH_3$ is acetophenone.

3. A crystalline complex cobalt-organo compound of the formula $$[Co(C_6H_5.CO.C_6H_5)_{1/4}][Co(CO)_4]_2$$

wherein $C_6H_5.CO.C_6H_5$ is benzophenone.

4. A crystalline complex cobalt-organo compound of the formula $$[Co(C_6H_5.CO.CO.C_6H_5)_{1/4}][Co(CO)_4]_2$$

wherein $C_6H_5CO.CO.C_6H_5$ is benzil.

5. A crystalline complex cobalt-organo compound of the formula $$[Co(C_4H_8O_2)_{1/2}][Co(CO)_4]_2$$

wherein $C_4H_8O_2$ is dioxane.

6. A crystalline complex cobalt-organo compound of the formula $$[Co(cyclooctanone)_{1/2}][Co(CO)_4]_2$$

7. A crystalline complex cobalt-organo compound of the formula $$[Co(cyclooctanone)_{1/2}][Co(CO)_4]_2$$

8. A crystalline complex cobalt-organo compound of the formula $$[Co(4,4'-dimethyl-1,3-dioxane)_{1/2}][Co(CO)_4]_2$$

9. A process for the production of a complex cobalt-organo compound containing carbon monoxide which comprises reacting dicobalt octacarbonyl with an organic compound capable of complexing with cobalt selected from the group consisting of cycloalkanone of from 5 to 15 carbon atoms, acetophenone, benzophenone, propiophenone, pyrophenone, benzil, dioxane and 4,4'-dimethyl-1,3-dioxane in an inert organic solvent at temperatures below about 40° C.

10. A process as claimed in claim 9 wherein the temperature is maintained below about 25° C.

11. A process as claimed in claim 9 wherein the temperature is maintained between about —10° C. and 25° C. and the resulting crystalline complex cobalt-organo compound is separated from the reaction mixture.

References Cited in the file of this patent
UNITED STATES PATENTS

| | | |
|---|---|---|
| 2,497,303 | Gresham et al. | Feb. 14, 1950 |
| 2,886,591 | Lautenschlager et al. | May 12, 1959 |

FOREIGN PATENTS

| | | |
|---|---|---|
| 1,044,805 | Germany | Nov. 27, 1958 |

OTHER REFERENCES

Wender et al.: J.A.C.S., vol. 74, page 2116 (1952).